United States Patent
Chen et al.

(10) Patent No.: US 12,517,278 B2
(45) Date of Patent: Jan. 6, 2026

(54) CIRCUIT AND APPARATUS FOR GENERATING SIGNAL SOURCE FOR IMPEDANCE MEASUREMENT OF ROCK AND ORE SAMPLES

(71) Applicant: GIANT SEQUOIA AI TECHNOLOGY (CHANGSHA) LIMITED, Changsha (CN)

(72) Inventors: Xingsheng Chen, Changsha (CN); Rujun Chen, Changsha (CN); Xiaojie Wang, Changsha (CN); Shaoheng Chun, Changsha (CN); Shengjie Li, Changsha (CN); Zihui Wang, Changsha (CN); Ruijie Shen, Changsha (CN); Hongchun Yao, Changsha (CN); Zhitong Liu, Changsha (CN); Shenglan Hou, Changsha (CN); Feifei Wang, Changsha (CN)

(73) Assignee: GIANT SEQUOIA AI TECHNOLOGY (CHANGSHA) LIMITED, Changsha (CN)

( * ) Notice: Subject to any disclaimer, the term of this patent is extended or adjusted under 35 U.S.C. 154(b) by 101 days.

(21) Appl. No.: 18/576,730

(22) PCT Filed: Dec. 27, 2022

(86) PCT No.: PCT/CN2022/142136
§ 371 (c)(1),
(2) Date: Jan. 4, 2024

(87) PCT Pub. No.: WO2023/125464
PCT Pub. Date: Jul. 6, 2023

(65) Prior Publication Data
US 2024/0288604 A1 Aug. 29, 2024

(30) Foreign Application Priority Data
Dec. 30, 2021 (CN) .......................... 202111658518.0

(51) Int. Cl.
*G01V 3/24* (2006.01)
*G01V 3/06* (2006.01)
*G01V 3/38* (2006.01)

(52) U.S. Cl.
CPC .................. *G01V 3/24* (2013.01); *G01V 3/06* (2013.01); *G01V 3/38* (2013.01)

(58) Field of Classification Search
CPC .............. G01V 3/24; G01V 3/06; G01V 3/38
(Continued)

(56) References Cited

U.S. PATENT DOCUMENTS

2008/0197861 A1    8/2008   Grosjean et al.

FOREIGN PATENT DOCUMENTS

| CN | 102944799 A | * | 2/2013 |
| CN | 103941293 | | 7/2014 |

(Continued)

OTHER PUBLICATIONS

International Search Report issued in PC/CN2022/142136, dated Feb. 21, 2023, and translation thereof.

*Primary Examiner* — Stephanie E Bloss
*Assistant Examiner* — Michael A Harrison
(74) *Attorney, Agent, or Firm* — ARC IP Law, PC; Joseph J. Mayo (57) ABSTRACT

The present disclosure provides a circuit and apparatus for generating a signal source for impedance measurement of rock and ore samples, including a smart mobile device; an integrated instrument, where the integrated instrument is connected to the smart mobile device via a wireless network, and a first electrode interface, a second electrode interface, a third electrode interface and a fourth electrode interface are fixedly arranged on the integrated instrument; and a sample rack, where the sample rack includes a first unpolarized electrode, a second unpolarized electrode, a third unpolar-
(Continued)

ized electrode, and a fourth unpolarized electrode, rock and ore samples are placed between the second unpolarized electrode and the third unpolarized electrode, and a first end of the first unpolarized electrode is electrically connected to the first electrode interface by a triaxial cable.

10 Claims, 4 Drawing Sheets

(58) Field of Classification Search
USPC .......................................................... 322/366
See application file for complete search history.

(56) References Cited

FOREIGN PATENT DOCUMENTS

| | | | | |
|---|---|---|---|---|
| CN | 205991957 | | | 3/2017 |
| CN | 108227004 | | | 6/2018 |
| CN | 114296508 | | | 4/2022 |
| CN | 120294374 | A | * | 7/2025 |
| WO | 2023125464 | | | 7/2023 |

* cited by examiner

CIRCUIT AND APPARATUS FOR GENERATING SIGNAL SOURCE FOR IMPEDANCE MEASUREMENT OF ROCK AND ORE SAMPLES

CROSS REFERENCE TO RELATED APPLICATION

The present application is a national stage application of International Patent Application No. PCT/CN2022/142136, filed on Dec. 27, 2022, which claims priority to Chinese Patent Application No. 202111658518.0, filed with the China National Intellectual Property Administration (CNIPA) on Dec. 30, 2021 and entitled "CIRCUIT AND APPARATUS FOR GENERATING SIGNAL SOURCE FOR IMPEDANCE MEASUREMENT OF ROCK AND ORE SAMPLES", which is incorporated herein by reference in its entirety.

TECHNICAL FIELD

The present disclosure relates to the technical field of direct digital synthesis (DDS) signal source generation, and in particular, to a circuit and apparatus for generating a signal source for impedance measurement of rock and ore samples.

BACKGROUND

A spectral induced polarization (SIP) method, also referred to as a complex resistivity method, is an electrical exploration method that is used to measure apparent complex resistivity in a very wide frequency range ($10^{-2}$-n×$10^2$ Hz) by emitting an alternating current into the underground, find geoelectric anomalies based on an amplitude spectrum, phase spectrum characteristics and spatial distribution of the measured apparent complex resistivity, and determine physical properties of a target abnormal body, so as to solve geological problems. Compared with other geophysical methods, in terms of high density measurement in spatial domain and frequency domain, the spectral induced polarization method has the advantages that the anti-interference capability is strong, more electrical parameters are obtained, and multi-parameter comparative interpretation can provide more abundant abnormal information, but the spectral induced polarization method also has some disadvantages, such as expensive instruments and devices, need for many people, low work efficiency, insufficient input impedance, and high production costs. In order to overcome the above disadvantages to some extent, it is urgent to design a spectral induced polarization measuring instrument with higher performance. Measuring impedance of rock and ore samples is the physical basis of the spectral induced polarization method, and is of great significance. Understanding differences of electrical properties between ore bodies and surrounding rocks through impedance measurement of rock and ore samples is the geophysical prerequisite of effective prospecting. To accurately measure the impedance of rock and ore samples or outcrops in some tough environments of geophysical exploration, more precise, portable and longer-lasting measuring instruments are needed.

Currently, impedance analyzers of mainstream spectral induced polarization measuring instruments can only complete constant voltage measurement in frequency domain, but cannot implement constant current measurement. An SCIP electrophysical property measuring instrument from Canada is a constant-voltage and constant-current measuring instrument in time domain, but there are currently no constant-voltage and constant-current measuring products in frequency domain. Most spectral induced polarization measuring instruments use an external signal generator as a signal source, and are only suitable for indoor measurement, and a 220 V inverter is needed in the case of outdoor measurement, which is very inconvenient for measurement of rock and ore outcrops in the field. Therefore, it is of great significance to develop a frequency domain multi-gear constant-voltage and constant-current rock and ore sample impedance tester with high precision, low power consumption and power supply by a portable power source, and the most critical technical difficulty is how to implement an integrated broadband multi-gear constant-current and constant-voltage signal source generation circuit.

Although there have been designs based on logic devices to control DDS chips to generate required analog signals in other industries, most of the designs are for signals outputted by specific signal processing circuits and specially required for electronic, medical measurement and control, and the like, and are not suitable for geophysical measurement, especially for frequency domain multi-gear constant-voltage and constant-current signal sources needed for impedance measurement of rock and ore samples.

SUMMARY

The present disclosure provides a circuit and apparatus for generating a signal source for impedance measurement of rock and ore samples, aiming to solve the problem that an existing instrument for impedance (spectral induced polarization) measurement of rock and ore samples needs an external signal generator to provide a signal source and is not suitable for outdoor measurement.

To achieve the above objective, an embodiment of the present disclosure provides a circuit and apparatus for generating a signal source for impedance measurement of rock and ore samples, including:
  a smart mobile device;
  an integrated instrument, where the integrated instrument is connected to the smart mobile device via a wireless network; a first electrode interface, a second electrode interface, a third electrode interface and a fourth electrode interface are fixedly arranged on the integrated instrument; and
  a sample rack, where the sample rack includes a first unpolarized electrode, a second unpolarized electrode, a third unpolarized electrode, and a fourth unpolarized electrode; rock and ore samples are placed between the second unpolarized electrode and the third unpolarized electrode; a first end of the first unpolarized electrode is electrically connected to the first electrode interface by a triaxial cable; a first end of the second unpolarized electrode is electrically connected to the third electrode interface by a triaxial cable; a second end of the second unpolarized electrode is electrically connected to a second end of the first unpolarized electrode; a first end of the third unpolarized electrode is electrically connected to the fourth electrode interface by a triaxial cable; a first end of the fourth unpolarized electrode is electrically connected to the second electrode interface by a triaxial cable; a second end of the fourth unpolarized electrode is electrically connected to a second end of the third unpolarized electrode; and a third end of the fourth unpolarized electrode is electrically connected to a ground terminal.

The present disclosure has the following beneficial effects.

In the circuit and apparatus for generating a signal source for impedance measurement of rock and ore samples according to the above embodiment of the present disclosure, a DDS signal generator is integrated on a circuit board by using a DDS technology, and is mounted in a case with the instrument control device. A portable power source is used for power supply without other power sources. The DDS signal generator and the instrument control device are integrated inside the integrated instrument, which reduces the size and weight of the integrated instrument, reduces the difficulty of field measurement, and well makes up for inconvenience of carrying an inverter, a storage battery, and the like in field power supply, thereby solving the problem that it is impossible to measure in an unfavorable terrain and a harsh environment. Except for the external electrode interfaces, other modules of the integrated instrument are sealed and fixed inside the case, which improves the dustproof, shockproof and moistureproof capabilities of a rock and ore sample impedance measuring instrument. A DDS chip used has functions such as frequency programmable, phase programmable, on-chip frequency division, phase locked loop and linear frequency sweep, and can be flexibly configured by writing registers, thereby leaving a great design margin for future applications with new requirements and functions for signal source output, and facilitating expansion, maintenance and upgrading.

DESCRIPTION OF REFERENCE NUMERALS

1—Smart mobile device; 2—Integrated instrument; 3—Sample rack; 4—First electrode interface; 5—Second electrode interface; 6—Third electrode interface; 7—Fourth electrode interface; 8—First unpolarized electrode; 9—Second unpolarized electrode; 10—Third unpolarized electrode; 11—Fourth unpolarized electrode; 12—Rock and ore samples; 13—Triaxial cable; 14—Instrument control device; 15—DDS signal generator; 16—Sampling resistor; 17—Embedded control system; 18—Acquisition card module; 19—Complex programmable logic device (CPLD) module; 20—Multi-channel analog-to-digital converter (ADC); 21—First seventh-order low-pass elliptic filter; 22—Buffer module; 23—Power module; 24—DDS chip; 25—Differential-to-single-ended conversion module; 26—Second seventh-order low-pass elliptic filter; 27—Multi-gear adjustment module; 28—Constant-current and constant-voltage module; 29—Phase accumulator; 30—N-bit accumulator; 31—N-bit register; 32—Waveform memory; 33—Digital-to-analog (D/A) converter; 34—Third seventh-order low-pass elliptic filter; 35—First resistor; 36—First single-pole single-throw relay; 37—Second resistor; 38—Second single-pole single-throw relay; 39—Third resistor; 40—Third single-pole single-throw relay; 41—Fourth resistor; 42—Fourth single-pole single-throw relay; 43—Fifth resistor; 44—Fifth single-pole single-throw relay; 45—Sixth resistor; 46—First integrated operational amplifier; 47—Seventh resistor; 48—Second integrated operational amplifier; 49—Eighth resistor; 50—Third integrated operational amplifier; 51—Ninth resistor; 52—Tenth resistor; 53—Eleventh resistor; 54—Twelfth resistor.

DETAILED DESCRIPTION OF THE EMBODIMENTS

To make the to-be-solved technical problems, technical solutions, and advantages of the present disclosure clearer, the present disclosure will be described in detail below with reference to the accompanying drawings and specific embodiments.

In view of the problem that an existing spectral induced polarization measuring instrument needs an external signal generator to provide a signal source, and is not suitable for outdoor measurement, the present disclosure provides a circuit and apparatus for generating a signal source for impedance measurement of rock and ore samples.

As shown in FIG. 1 to FIG. 5, an embodiment of the present disclosure provides a circuit and apparatus for generating a signal source for impedance measurement of rock and ore samples, including a smart mobile device 1; an integrated instrument 2, where the integrated instrument 2 is connected to the smart mobile device 1 via a wireless network; and a first electrode interface 4, a second electrode interface 5, a third electrode interface 6 and a fourth electrode interface 7 are fixedly arranged on the integrated instrument 2; and a sample rack 3, where the sample rack 3 includes a first unpolarized electrode 8, a second unpolarized electrode 9, a third unpolarized electrode 10, and a fourth unpolarized electrode 11; rock and ore samples 12 are placed between the second unpolarized electrode 9 and the third unpolarized electrode 10; a first end of the first unpolarized electrode 8 is electrically connected to the first electrode interface 4 by a triaxial cable 13; a first end of the second unpolarized electrode 9 is electrically connected to the third electrode interface 6 by a triaxial cable 13; a second end of the second unpolarized electrode 9 is electrically connected to a second end of the first unpolarized electrode 8; a first end of the third unpolarized electrode 10 is electrically connected to the fourth electrode interface 7 by a triaxial cable 13; a first end of the fourth unpolarized electrode 11 is electrically connected to the second electrode interface 5 by a triaxial cable 13; a second end of the fourth unpolarized electrode 11 is electrically connected to a second end of the third unpolarized electrode 10; and a third end of the fourth unpolarized electrode 11 is electrically connected to a ground terminal.

Figure 1:
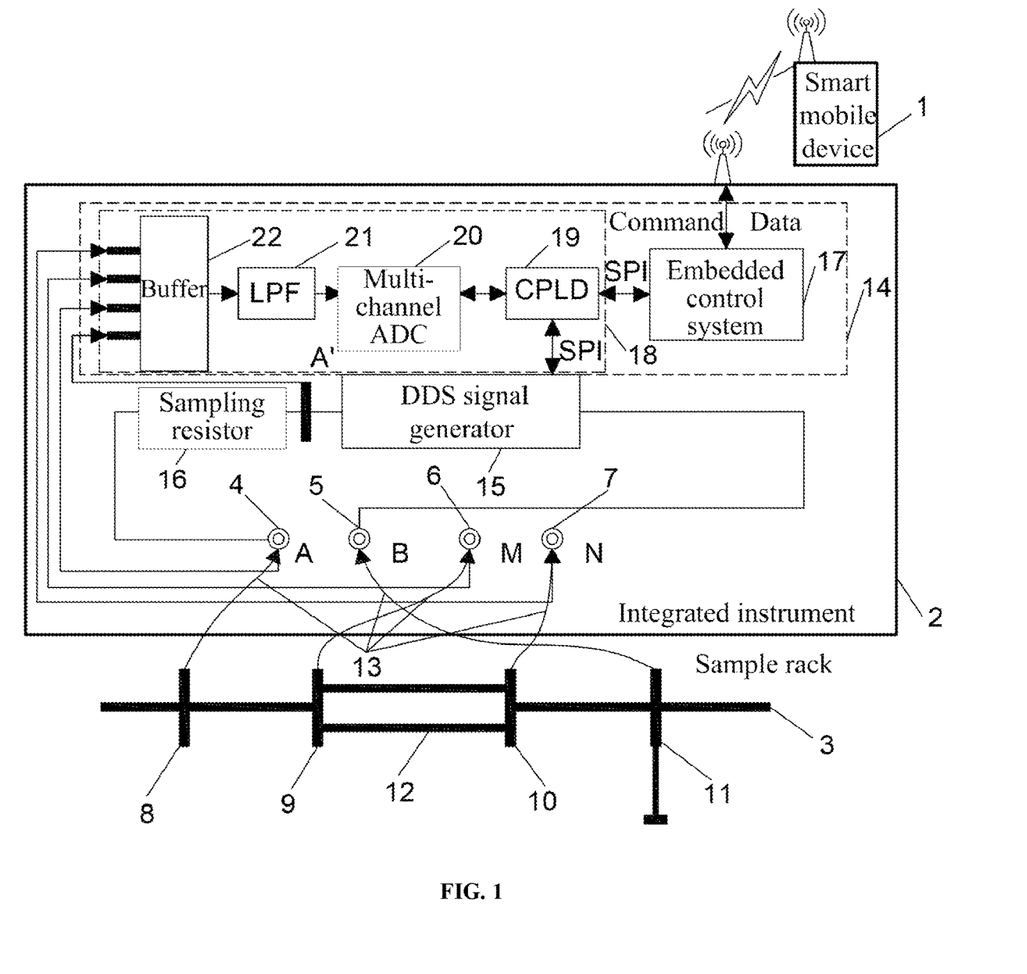
FIG. 1 is a schematic diagram of an overall structure according to the present disclosure.

The smart mobile device 1 includes an Android application (APP), and the Android APP is configured to send and receive data.

In the circuit and apparatus for generating a signal source for impedance measurement of rock and ore samples according to the above embodiment of the present disclosure, the smart mobile device 1 is connected to the integrated instrument 2 via a wireless network by Bluetooth, and the integrated instrument 2 is connected to the sample rack 3 by a triaxial cable 13; the smart mobile device 1 includes the Android APP, and the Android APP is configured to send a command to the integrated instrument 2 and receive data. The smart mobile device 1 is mainly a smart phone equipped with an Android operating system, or may be a smart phone, tablet or another smart mobile device 1 equipped with a system such as iOS or Linux. The circuit and apparatus for generating a signal source for impedance measurement of rock and ore samples take the smart mobile device 1 as a controller of the integrated instrument 2, and the smart mobile device 1 is compact and portable, is widely used, has low power consumption and a small size, and can be controlled remotely, thereby greatly reducing the difficulty of field work and improving safety of staff.

In the circuit and apparatus for generating a signal source for impedance measurement of rock and ore samples according to the above embodiment of the present disclosure, the control command of the smart mobile device 1 to the integrated instrument 2 includes: configuration of a signal frequency, an amplitude and a constant voltage and constant current mode of a DDS signal generator 15 for the integrated instrument 2, configuration of a sampling rate and gain of a multi-channel ADC 20 and calibration and self-check of the multi-channel ADC 20 at the beginning of measurement; and control of acquisition of the multi-channel ADC 20 and control of data uploading of a CPLD module 19 and an embedded control system 17 during the measurement.

The integrated instrument 2 includes: an instrument control device 14, where the instrument control device 14 is mounted in a case of the integrated instrument 2; a DDS signal generator 15, where the DDS signal generator 15 is mounted in the case of the integrated instrument 2, a first end of the DDS signal generator 15 is electrically connected to a first end of the instrument control device 14, a second end of the DDS signal generator 15 is electrically connected to the second electrode interface 5, and a third end of the DDS signal generator 15 is electrically connected to a second end of the instrument control device 14; and a sampling resistor 16, where a first end of the sampling resistor 16 is electrically connected to the third end of the DDS signal generator 15.

In the circuit and apparatus for generating a signal source for impedance measurement of rock and ore samples according to the above embodiment of the present disclosure, the DDS signal generator 15 is configured to buffer a frequency control command, a multi-gear adjustment control command and a multi-gear constant voltage and constant current switching control command generated by the instrument control device 14, so as to prevent the case that a transmission distance of the DDS signal generator 15 is too long, which leads to an insufficient control command driving capability, making it impossible to achieve correct control.

The instrument control device 14 includes an embedded control system 17 and an acquisition card module 18, where the embedded control system 17 is wirelessly connected to the smart mobile device 1; a first end of the acquisition card module 18 is electrically connected to a first end of the embedded control system 17; a second end of the acquisition card module 18 is electrically connected to the first end of the DDS signal generator 15; a third end of the acquisition card module 18 is electrically connected to the third end of the DDS signal generator 15; a fourth end of the acquisition card module 18 is electrically connected to the first electrode interface 4; a fifth end of the acquisition card module 18 is electrically connected to the third electrode interface 6; and a sixth end of the acquisition card module 18 is electrically connected to the fourth electrode interface 7.

The acquisition card module 18 includes: a CPLD module 19, where a first end of the CPLD module 19 is electrically connected to the first end of the embedded control system 17, and a second end of the CPLD module 19 is electrically connected to the first end of the DDS signal generator 15; a multi-channel ADC 20, where a first end of the multi-channel ADC 20 is electrically connected to the second end of the CPLD module 19; a first seventh-order low-pass elliptic filter 21, where a first end of the first seventh-order low-pass elliptic filter 21 is electrically connected to a second end of the multi-channel ADC 20; and a buffer module 22, where a first end of the buffer module 22 is electrically connected to a second end of the first seventh-order low-pass elliptic filter 21, a second end of the buffer module 22 is electrically connected to the third end of the DDS signal generator 15, a third end of the buffer module 22 is electrically connected to the first electrode interface 4, a fourth end of the buffer module 22 is electrically connected to the third electrode interface 6, and a fifth end of the buffer module 22 is electrically connected to the fourth electrode interface 7.

In the circuit and apparatus for generating a signal source for impedance measurement of rock and ore samples according to the above embodiment of the present disclosure, the integrated instrument 2 includes the buffer module 22, the CPLD module 19, the first seventh-order low-pass elliptic filter 21, and the multi-channel ADC 20, where the buffer module 22 is configured to buffer a potential value of each electrode to reduce a measurement error; the first seventh-order low-pass elliptic filter 21 is configured to filter out high-frequency interference of the potential value; the multi-channel ADC 20 is configured to convert a measured potential analog signal into a digital signal and transmit the digital signal to the CPLD module 19; the CPLD module 19 is configured to receive a command issued by the embedded control system 17, decode and control each module and upload collected data to the embedded control system 17; the embedded control system 17 is configured to receive a command wirelessly transmitted by the smart mobile device 1 and issue the command to the CPLD module 19, receive collected data, and upload the collected data to the smart mobile device 1; the sampling resistor 16 is configured to measure a current passing through the rock and ore samples 12; the DDS signal generator 15 is configured to generate a DDS signal with a programmable frequency and phase, five gears and an optional constant voltage and constant current mode; the first unpolarized electrode 8, the second unpolarized electrode 9, the third unpolarized electrode 10 and the fourth unpolarized electrode 11 are configured to measure potential signals, and the rock and ore samples 12 are samples to be measured.

In the circuit and apparatus for generating a signal source for impedance measurement of rock and ore samples according to the above embodiment of the present disclosure, the embedded control system 17 is configured to send a result of potential signal acquisition to an upper computer for processing and display, and the acquisition card module 18 is configured to provide a hardware circuit for potential signal acquisition measured by the signal source based on the DDS signal generator 15.

Figure 2:
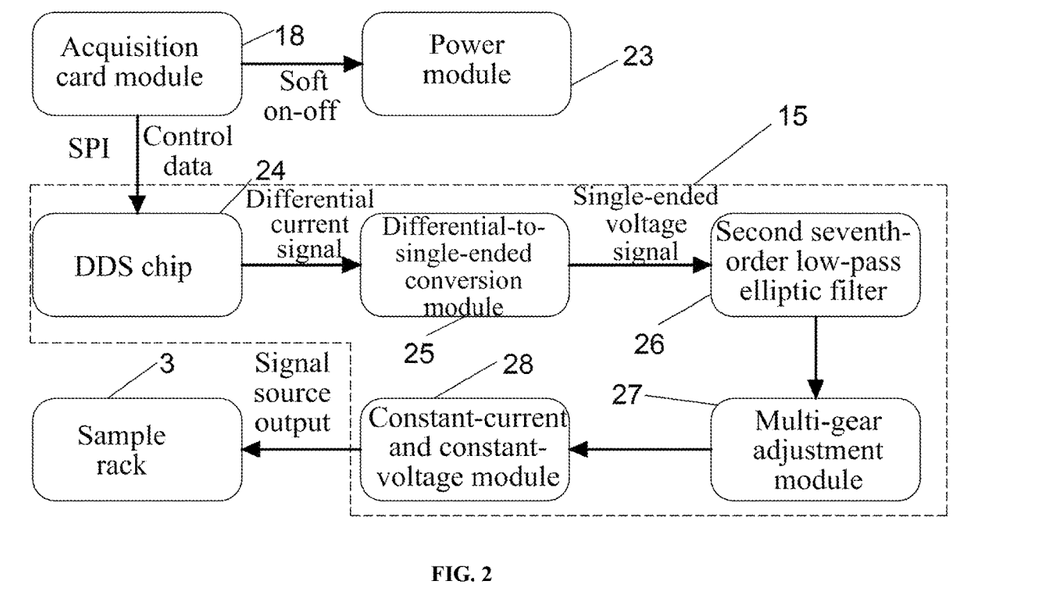
FIG. 2 is a schematic diagram of a specific structure of a DDS signal generator according to the present disclosure.

As shown in FIG. 2, the integrated instrument 2 further includes a power module 23, where the power module 23 is arranged in the case of the integrated instrument 2, and the power module 23 is electrically connected to a seventh end of the acquisition card module 18.

The DDS signal generator 15 includes: a DDS chip 24, where a first end of the DDS chip 24 is electrically connected to the second end of the acquisition card module 18; a differential-to-single-ended conversion module 25, where a first end of the differential-to-single-ended conversion module 25 is electrically connected to a second end of the DDS chip 24; a second seventh-order low-pass elliptic filter 26, where a first end of the second seventh-order low-pass elliptic filter 26 is electrically connected to a second end of the differential-to-single-ended conversion module 25; a multi-gear adjustment module 27, where a first end of the multi-gear adjustment module 27 is electrically connected to a second end of the second seventh-order low-pass elliptic filter 26; and a constant-current and constant-voltage module 28, where a first end of the constant-current and constant-voltage module 28 is electrically connected to a second end of the multi-gear adjustment module 27, and a second end of the constant-current and constant-voltage module 28 is electrically connected to the sample rack 3.

In the circuit and apparatus for generating a signal source for impedance measurement of rock and ore samples according to the above embodiment of the present disclosure, the DDS chip 24 of the DDS signal generator 15 is configured to receive and execute the frequency control command sent by the instrument control device 14, the multi-gear adjustment module 27 is configured to receive and execute the adjustment control command sent by the instrument control device 14, and the constant-current and constant-voltage module 28 is configured to receive and execute the constant voltage and constant current switching control command sent by the instrument control device 14.

In the circuit and apparatus for generating a signal source for impedance measurement of rock and ore samples according to the above embodiment of the present disclosure, power conversion is performed by the power module 23 to provide a power source required for the circuit and apparatus for generating a signal source for impedance measurement of rock and ore samples; the DDS chip 24 is configured to generate a DDS signal with a programmable frequency and phase; the differential-to-single-ended conversion module 25 is configured to convert a differential constant current signal generated by the DDS chip 24 into a single-ended constant voltage signal to make up for an insufficient driving force of the DDS chip 24; the second seventh-order low-pass elliptic filter 26 is configured to filter a single-ended constant voltage signal of the differential-to-single-ended conversion module 25, to filter out high-frequency interference and spurs in the DDS signal generated by the DDS chip 24; the constant-current and constant-voltage module 28 is configured to perform constant voltage and constant current conversion to generate signal source output; and a multi-gear adjustment circuit is configured to perform multi-gear adjustment by using an attenuator, with a total of five gears. The signal outputted by the DDS chip 24 is an adjustable constant current differential signal, and the DDS chip 24 has the function of adjusting a signal amplitude by an external resistor. However, the DDS chip 24 is highly integrated and contains digital and analog interactive parts, and the power supply driving capability of the DDS chip 24 alone is insufficient, so that it is impossible to drive a high-power load, and thus a design of multi-gear adjustment is not performed inside the DDS chip 24, and thus the DDS output signal is converted into a single-ended voltage signal by the differential-to-single-ended conversion module 25 and then the signal is subjected to multi-gear amplification by using an integrated operational amplifier.

Figure 3:
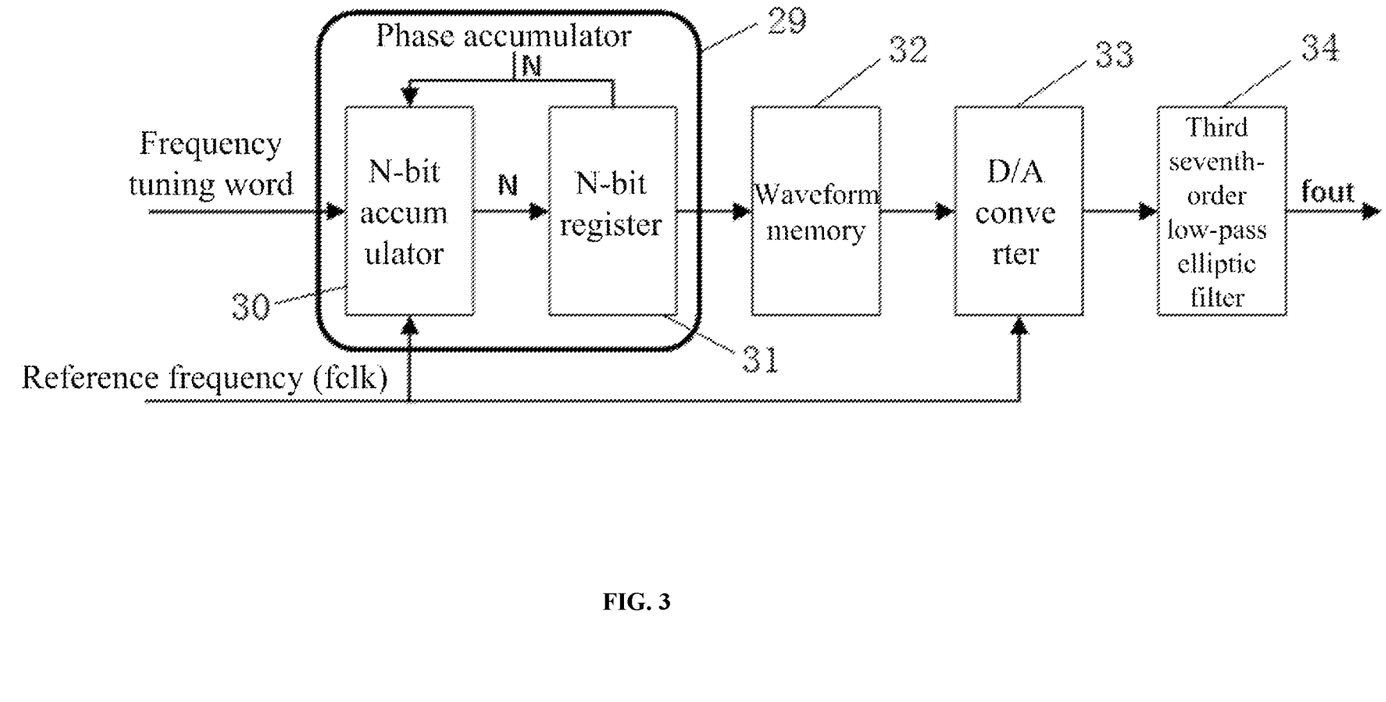
FIG. 3 is a schematic diagram of a specific structure of a DDS chip according to the present disclosure.

As shown in FIG. 3, the DDS chip 24 includes: a phase accumulator 29, where the phase accumulator 29 includes an N-bit accumulator 30 and an N-bit register 31, a first end of the N-bit accumulator 30 is electrically connected to the second end of the acquisition card module 18, a second end of the N-bit accumulator 30 is electrically connected to the second end of the acquisition card module 18, a first end of the N-bit register 31 is electrically connected to a third end of the N-bit accumulator 30, and a second end of the N-bit register 31 is electrically connected to a fourth end of the N-bit accumulator 30; a waveform memory 32, where a first end of the waveform memory 32 is electrically connected to a third end of the N-bit register 31; a D/A converter 33, where a first end of the D/A converter 33 is electrically connected to a second end of the waveform memory 32, and a second end of the D/A converter 33 is electrically connected to the second end of the N-bit accumulator 30; and a third seventh-order low-pass elliptic filter 34, where a first end of the third seventh-order low-pass elliptic filter 34 is electrically connected to a third end of the D/A converter 33.

In the circuit and apparatus for generating a signal source for impedance measurement of rock and ore samples according to the above embodiment of the present disclosure, a signal generation process of the DDS signal generator 15 is as follows: The DDS chip 24 provides control of a frequency tuning word and reference frequencies folk by the acquisition card module 18 to generate a DDS signal with a response frequency, and the phase accumulator 29 creates a digital phase relationship based on the frequency tuning word and the reference frequencies folk; the N-bit accumulator 30 accumulates a phase component converted by the frequency tuning word at each reference frequency folk, and the N-bit memory stores an accumulated total phase component; the waveform memory 32 receives the total phase component of the N-bit memory, and a corresponding amplitude value is addressed and taken out from the waveform memory 32 where the storage has been completed; the D/A converter 33 converts a digital signal of the amplitude value into an analog signal for output, and the third seventh-order low-pass elliptic filter 34 preliminarily filters out high-frequency interference and spurs of the DDS signal.

Specifically, an output frequency is calculated by using the frequency tuning word (FTW), the reference frequency fclk and a number N of bits of the phase accumulator 29 of the DDS chip 24:

$$f_{out} = \frac{FTW * (f_s)}{2^N}.$$

A larger number N of bits of the phase accumulator 29 indicates a more accurate frequency resolution obtained. Signal quality of the reference frequency folk directly determines signal quality of the output frequency fout, so the reference frequency folk needs a stable clock signal source, which can be provided by an active crystal oscillator, the CPLD module 19 or a phase-locked loop, so as to improve stability of the reference frequency folk to a largest extent. When a programmable logic device has enough reserved resources, a function of the DDS chip 24 can also be directly achieved by the programmable logic device plus the D/A converter 33.

Figure 4:
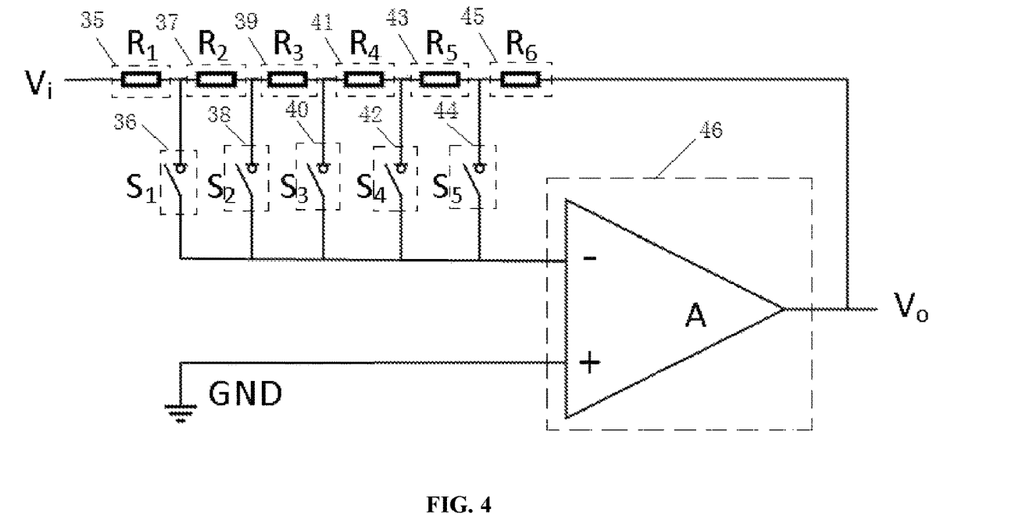
FIG. 4 is a schematic diagram of a specific circuit of a multi-gear adjustment module according to the present disclosure.

As shown in FIG. 4, the multi-gear adjustment module 27 includes: a first resistor 35, where a first end of the first resistor 35 is electrically connected to the second end of the second seventh-order low-pass elliptic filter 26; a first single-pole single-throw relay 36, where a first end of the first single-pole single-throw relay 36 is electrically connected to a second end of the first resistor 35; a second resistor 37, where a first end of the second resistor 37 is electrically connected to the second end of the first resistor 35; a second single-pole single-throw relay 38, where a first end of the second single-pole single-throw relay 38 is electrically connected to a second end of the second resistor 37, and a second end of the second single-pole single-throw relay 38 is electrically connected to a second end of the first single-pole single-throw relay 36; a third resistor 39, where a first end of the third resistor 39 is electrically connected to the second end of the second resistor 37; a third single-pole single-throw relay 40, where a first end of the third single-pole single-throw relay 40 is electrically connected to a second end of the third resistor 39, and a second end of the third single-pole single-throw relay 40 is electrically connected to the second end of the second single-pole single-throw relay 38; a fourth resistor 41, where a first end of the fourth resistor 41 is electrically connected to the second end of the third resistor 39; a fourth single-pole single-throw relay 42, where a first end of the fourth single-pole single-throw relay 42 is electrically connected to a second end of the fourth resistor 41, and a second end of the fourth single-pole single-throw relay 42 is electrically connected to the second end of the third single-pole single-throw relay 40; a fifth resistor 43, where a first end of the fifth resistor 43 is electrically connected to the second end of the fourth resistor 41; a fifth single-pole single-throw relay 44, where a first end of the fifth single-pole single-throw relay 44 is electrically connected to a second end of the fifth resistor 43, and a second end of the fifth single-pole single-throw relay 44 is electrically connected to the second end of the fourth single-pole single-throw relay 42; a sixth resistor 45, where a first end of the sixth resistor 45 is electrically connected to the first end of the fifth resistor 43; and a first integrated operational amplifier 46, where a negative input end of the first integrated operational amplifier 46 is electrically connected to the second end of the fifth single-pole single-throw relay 44, a positive input end of the first integrated operational amplifier 46 is electrically connected to the ground terminal, and an output end of the first integrated operational amplifier 46 is electrically connected to a second end of the sixth resistor 45.

In the circuit and apparatus for generating a signal source for impedance measurement of rock and ore samples according to the above embodiment of the present disclosure, the multi-gear adjustment module 27 can eliminate the impact of on-resistance on an accurate gear value and reduce gear voltage errors, and single-pole single-throw relay control is used. The relay control has the advantages that the relay has very short on-off time, a control signal and an output signal are completely isolated from each other and do not affect each other, and the on-resistance is very low. The first resistor 35, the second resistor 37, the third resistor 39, the fourth resistor 41, the fifth resistor 43 and the sixth resistor 45 are configured to form feedback amplification or attenuation signals. The first single-pole single-throw relay 36, the second single-pole single-throw relay 38, the third single-pole single-throw relay 40, the fourth single-pole single-throw relay 42 and the fifth single-pole single-throw relay 44 are configured to control five-gear amplification. The first integrated operational amplifier 46 provides driving energy for signal multi-gear adjustment, and the multi-gear adjustment module 27 can eliminate the impact of the on-resistance on the accurate gear value and reduce the gear voltage errors. Specifically, there is a certain ratio relationship between a resistance design and a gear size:

$$\begin{cases} R1 + R2 + R3 + R4 + R5 = K5R6 \\ R1 + R2 + R3 + R4 = K4(R5 + R6) \\ R1 + R2 + R3 = K3(R4 + R5 + R6) \\ R1 + R2 = K2(R3 + R4 + R5 + R6) \\ R1 = K1(R2 + R3 + R4 + R5 + R6) \end{cases}$$

where K1-K5 each are a ratio of output to input; R1 is the first resistor 35, R2 is the second resistor 37, R3 is the third resistor 39, R4 is the fourth resistor 41, R5 is the fifth resistor 43, and R6 is the sixth resistor 45; $S_1$-$S_5$ are single-pole single-throw relays directly controlled by digital signals respectively, and $S_1$-$S_5$ are in a one-to-one correspondence to the first single-pole single-throw relay 36, the second single-pole single-throw relay 38, the third single-pole single-throw relay 40, the fourth single-pole single-throw relay 42, and the fifth single-pole single-throw relay 44, respectively. The single-pole single-throw relays have very short on-off time, and the control signal and the output signal are completely isolated from each other and do not affect each other, and the on-resistance is very low. The first integrated operational amplifier 46 requires a lower noise level, and an output voltage and power that meet gear requirements, to avoid distortion and drift, and minimize interference undergone by signals in multi-gear adjustment.

Figure 5:
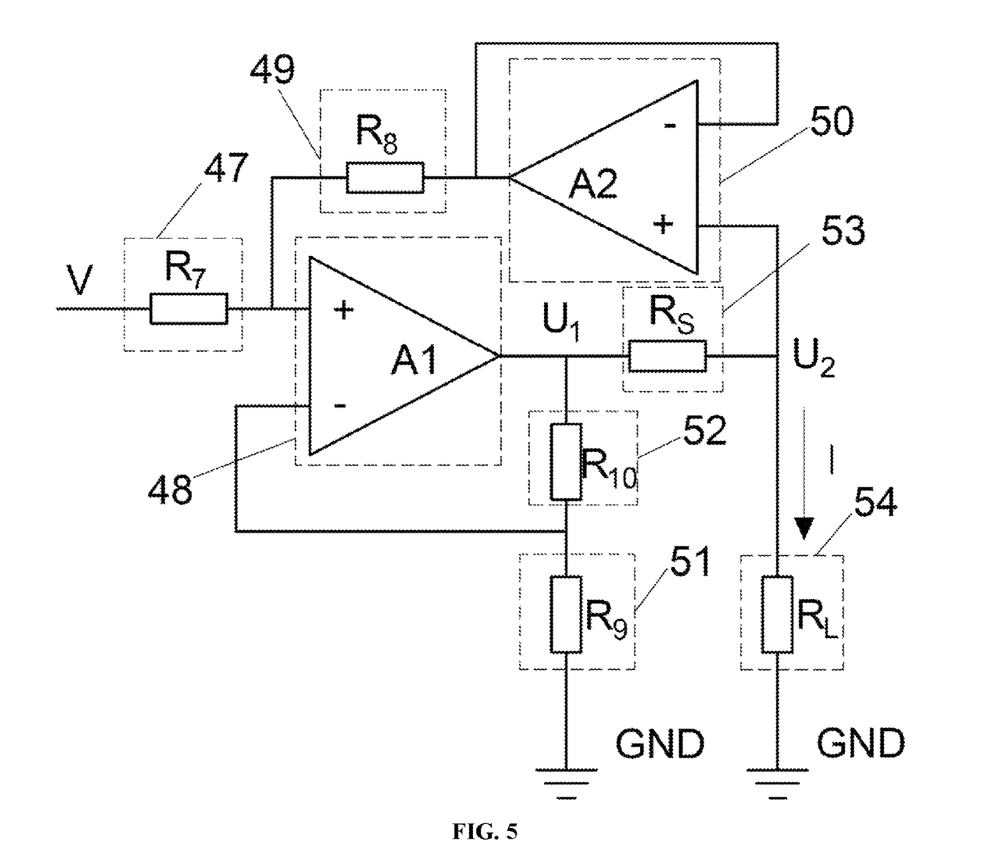
FIG. 5 is a schematic diagram of a specific circuit of a constant-current and constant-voltage module according to the present disclosure.

As shown in FIG. 5, the constant-current and constant-voltage module 28 includes: a seventh resistor 47, where a first end of the seventh resistor 47 is electrically connected to the output end of the first integrated operational amplifier 46; a second integrated operational amplifier 48, where a positive input end of the second integrated operational amplifier 48 is electrically connected to a second end of the seventh resistor 47; an eighth resistor 49, where a first end of the eighth resistor 49 is electrically connected to the positive input end of the second integrated operational amplifier 48; a third integrated operational amplifier 50, where an output end of the third integrated operational amplifier 50 is electrically connected to a second end of the eighth resistor 49, and a negative input end of the third integrated operational amplifier 50 is electrically connected to an output end of the third integrated operational amplifier 50; a ninth resistor 51, where a first end of the ninth resistor 51 is electrically connected to a negative input end of the second integrated operational amplifier 48, and a second end of the ninth resistor 51 is electrically connected to the ground terminal; a tenth resistor 52, where a first end of the tenth resistor 52 is electrically connected to an output end of the second integrated operational amplifier 48, and a second end of the tenth resistor 52 is electrically connected to the first end of the ninth resistor 51; an eleventh resistor 53, where a first end of the eleventh resistor 53 is electrically connected to the first end of the tenth resistor 52, and a second end of the eleventh resistor 53 is electrically connected to a positive input end of the third integrated operational amplifier 50; and a twelfth resistor 54, where a first end of the twelfth resistor 54 is electrically connected to the second end of the eleventh resistor 53, and a second end of the twelfth resistor 54 is electrically connected to the ground terminal.

In the circuit and apparatus for generating a signal source for impedance measurement of rock and ore samples according to the above embodiment of the present disclosure, the seventh resistor 47, the eighth resistor 49 and the ninth resistor 51 are configured to feed back signals and perform constant voltage and constant current conversion; and the second integrated operational amplifier 48 and the third integrated operational amplifier 50 are configured to provide driving energy for the constant voltage and constant current conversion.

Specifically, there is a certain ratio relationship between the resistance design and constant current output:

$$U_+ = \frac{R8}{R7+R8}V + \frac{R7}{R7+R8}U$$

$$U_- = \frac{R9}{R9+R10}U1$$

$$I = \frac{U1-U2}{RS}$$

and $U_+ = U_-$

Set $$\frac{R7}{R8} = \frac{R9}{R10} = K$$

Through sorting-out:

$$\frac{1}{1+K}V + \frac{K}{1+K}U2 = \frac{K}{1+K}U1$$

Therefore, $$I = \frac{U1-U2}{RS} = \frac{V}{K*RS},$$

where $$K = \frac{R7}{R8} = \frac{R9}{R10}$$

is independent of load resistance.

R7 is the seventh resistor 47, R8 is the eighth resistor 49, and R9 is the ninth resistor 51. The resistance design, that is, the magnitude of K, needs to be determined based on a specific constant voltage signal. Considering the problems of power consumption, noise, signal distortion, offset of integrated operational amplifiers, and the like, two circuits are designed for conversion of a high voltage (10 V) and a low voltage (1 V, 100 mV, 10 mV, 1 mV) from a constant voltage to a constant current. Since the power source for the integrated operational amplifiers is only ±14 V, the conversion of the high voltage (10 V) is prone to distortion but is unlikely to be affected by noise and offset. Therefore, for a circuit for conversion of this voltage, it is required that K<⅕, and the resistance of the eleventh resistor 53 is correspondingly increased to meet output requirements of a current I. Similarly, the conversion of the low voltage (1 V, 100 mV, 10 mV, and 1 mV) is likely to be affected by noise and offset, but is not prone to distortion. Therefore, for a circuit for conversion of a low voltage, it is required that K is maximized (K>5), so as to reduce the noise and offset undergone by the output signal.

In the circuit and apparatus for generating a signal source for impedance measurement of rock and ore samples according to the above embodiment of the present disclosure, by soft on-off control of the power module 23, programmable frequency and phase control of the DDS signal outputted by the DDS chip 24, control of the signal source gear of the multi-gear adjustment circuit and configuration of the constant-current and constant-voltage module 28 in a constant voltage and constant current mode, a programmable waveform function, an on-chip frequency division function, an on-chip phase-locked loop function, an adjustable stepping linear frequency sweep function, a multi-DDS signal source synchronization function and a current mode logic (CML) current mode logic output function, and the like are achieved, and can all be extended for use. In the circuit and apparatus for generating a signal source for impedance measurement of rock and ore samples, the generation of the DDS signal source is achieved, and the smart mobile device 1 is used as the controller of the signal source, which makes the control more convenient and faster. Through the integrated instrument design, the entire integrated instrument 2 features light weight, small size and power consumption, and facilitate field acquisition.

The foregoing are descriptions of preferred implementations of the present disclosure. It should be noted that those of ordinary skill in the art can make several improvements and modifications without departing from the principle of the present disclosure, and such improvements and modifications should be deemed as falling within the protection scope of the present disclosure.

What is claimed is:

1. A circuit and apparatus for generating a signal source for impedance measurement of rock and ore samples, comprising:
    a smart mobile device;
    an integrated instrument, wherein the integrated instrument is connected to the smart mobile device via a wireless network; a first electrode interface, a second electrode interface, a third electrode interface and a fourth electrode interface are fixedly arranged on the integrated instrument; and
    a sample rack, wherein the sample rack comprises a first unpolarized electrode, a second unpolarized electrode, a third unpolarized electrode, and a fourth unpolarized electrode; rock and ore samples are placed between the second unpolarized electrode and the third unpolarized electrode, and a first end of the first unpolarized electrode is electrically connected to the first electrode interface by a triaxial cable; a first end of the second unpolarized electrode is electrically connected to the third electrode interface by a triaxial cable; a second end of the second unpolarized electrode is electrically connected to a second end of the first unpolarized electrode; a first end of the third unpolarized electrode is electrically connected to the fourth electrode interface by a triaxial cable; a first end of the fourth unpolarized electrode is electrically connected to the second electrode interface by a triaxial cable; a second end of the fourth unpolarized electrode is electrically connected to a second end of the third unpolarized electrode; and a third end of the fourth unpolarized electrode is electrically connected to a ground terminal.

2. The circuit and apparatus for generating a signal source for impedance measurement of rock and ore samples according to claim 1, wherein the smart mobile device comprises an Android application (APP), and the Android APP is configured to send and receive data.

3. The circuit and apparatus for generating a signal source for impedance measurement of rock and ore samples according to claim 2, wherein the integrated instrument comprises:
    an instrument control device, wherein the instrument control device is mounted in a case of the integrated instrument;
    a direct digital synthesis (DDS) signal generator, wherein the DDS signal generator is mounted in the case of the integrated instrument; a first end of the DDS signal generator is electrically connected to a first end of the instrument control device; a second end of the DDS signal generator is electrically connected to the second electrode interface; a third end of the DDS signal generator is electrically connected to a second end of the instrument control device; and a sampling resistor, wherein a first end of the sampling resistor is electrically connected to the third end of the DDS signal generator.

4. The circuit and apparatus for generating a signal source for impedance measurement of rock and ore samples according to claim 3, wherein the instrument control device comprises an embedded control system and an acquisition card module;

the embedded control system is wirelessly connected to the smart mobile device; and a first end of the acquisition card module is electrically connected to a first end of the embedded control system; a second end of the acquisition card module is electrically connected to the first end of the DDS signal generator; a third end of the acquisition card module is electrically connected to the third end of the DDS signal generator; a fourth end of the acquisition card module is electrically connected to the first electrode interface; a fifth end of the acquisition card module is electrically connected to the third electrode interface; and a sixth end of the acquisition card module is electrically connected to the fourth electrode interface.

5. The circuit and apparatus for generating a signal source for impedance measurement of rock and ore samples according to claim 4, wherein the acquisition card module comprises:

a complex programmable logic device (CPLD) module, wherein a first end of the CPLD module is electrically connected to the first end of the embedded control system; a second end of the CPLD module is electrically connected to the first end of the DDS signal generator;

a multi-channel analog-to-digital converter (ADC), wherein a first end of the multi-channel ADC is electrically connected to the second end of the CPLD module;

a first seventh-order low-pass elliptic filter, wherein a first end of the first seventh-order low-pass elliptic filter is electrically connected to a second end of the multi-channel ADC; and a buffer module, wherein a first end of the buffer module is electrically connected to a second end of the first seventh-order low-pass elliptic filter; a second end of the buffer module is electrically connected to the third end of the DDS signal generator; a third end of the buffer module is electrically connected to the first electrode interface; a fourth end of the buffer module is electrically connected to the third electrode interface; and a fifth end of the buffer module is electrically connected to the fourth electrode interface.

6. The circuit and apparatus for generating a signal source for impedance measurement of rock and ore samples according to claim 5, wherein the integrated instrument further comprises:

a power module, wherein the power module is arranged in the case of the integrated instrument, and the power module is electrically connected to a seventh end of the acquisition card module.

7. The circuit and apparatus for generating a signal source for impedance measurement of rock and ore samples according to claim 6, wherein the DDS signal generator comprises:

a DDS chip, wherein a first end of the DDS chip is electrically connected to the second end of the acquisition card module;

a differential-to-single-ended conversion module, wherein a first end of the differential-to-single-ended conversion module is electrically connected to a second end of the DDS chip;

a second seventh-order low-pass elliptic filter, wherein a first end of the second seventh-order low-pass elliptic filter is electrically connected to a second end of the differential-to-single-ended conversion module;

a multi-gear adjustment module, wherein a first end of the multi-gear adjustment module is electrically connected to a second end of the second seventh-order low-pass elliptic filter; and a constant-current and constant-voltage module, wherein a first end of the constant-current and constant-voltage module is electrically connected to a second end of the multi-gear adjustment module; and a second end of the constant-current and constant-voltage module is electrically connected to the sample rack.

8. The circuit and apparatus for generating a signal source for impedance measurement of rock and ore samples according to claim 7, wherein the DDS chip comprises:

a phase accumulator, wherein the phase accumulator comprises an N-bit accumulator and an N-bit register, a first end of the N-bit accumulator is electrically connected to the second end of the acquisition card module; a second end of the N-bit accumulator is electrically connected to the second end of the acquisition card module; a first end of the N-bit register is electrically connected to a third end of the N-bit accumulator; a second end of the N-bit register is electrically connected to a fourth end of the N-bit accumulator;

a waveform memory, wherein a first end of the waveform memory is electrically connected to a third end of the N-bit register;

a digital-to-analog (D/A) converter, wherein a first end of the D/A converter is electrically connected to a second end of the waveform memory; a second end of the D/A converter is electrically connected to the second end of the N-bit accumulator; and a third seventh-order low-pass elliptic filter, wherein a first end of the third seventh-order low-pass elliptic filter is electrically connected to a third end of the D/A converter.

9. The circuit and apparatus for generating a signal source for impedance measurement of rock and ore samples according to claim 8, wherein the multi-gear adjustment module comprises:

a first resistor, wherein a first end of the first resistor is electrically connected to the second end of the second seventh-order low-pass elliptic filter;

a first single-pole single-throw relay, wherein a first end of the first single-pole single-throw relay is electrically connected to a second end of the first resistor;

a second resistor, wherein a first end of the second resistor is electrically connected to the second end of the first resistor;

a second single-pole single-throw relay, wherein a first end of the second single-pole single-throw relay is electrically connected to a second end of the second resistor; a second end of the second single-pole single-throw relay is electrically connected to a second end of the first single-pole single-throw relay;

a third resistor, wherein a first end of the third resistor is electrically connected to the second end of the second resistor;

a third single-pole single-throw relay, wherein a first end of the third single-pole single-throw relay is electrically connected to a second end of the third resistor; a second end of the third single-pole single-throw relay is electrically connected to the second end of the second single-pole single-throw relay;

a fourth resistor, wherein a first end of the fourth resistor is electrically connected to the second end of the third resistor;

a fourth single-pole single-throw relay, wherein a first end of the fourth single-pole single-throw relay is electrically connected to a second end of the fourth resistor; a second end of the fourth single-pole single-throw relay is electrically connected to the second end of the third single-pole single-throw relay;

a fifth resistor, wherein a first end of the fifth resistor is electrically connected to the second end of the fourth resistor;

a fifth single-pole single-throw relay, wherein a first end of the fifth single-pole single-throw relay is electrically connected to a second end of the fifth resistor; a second end of the fifth single-pole single-throw relay is electrically connected to the second end of the fourth single-pole single-throw relay;

a sixth resistor, wherein a first end of the sixth resistor is electrically connected to the first end of the fifth resistor; and a first integrated operational amplifier, wherein a negative input end of the first integrated operational amplifier is electrically connected to the second end of the fifth single-pole single-throw relay; a positive input end of the first integrated operational amplifier is electrically connected to the ground terminal; and an output end of the first integrated operational amplifier is electrically connected to a second end of the sixth resistor.

10. The circuit and apparatus for generating a signal source for impedance measurement of rock and ore samples according to claim 9, wherein the constant-current and constant-voltage module comprises:

a seventh resistor, wherein a first end of the seventh resistor is electrically connected to the output end of the first integrated operational amplifier;

a second integrated operational amplifier, wherein a positive input end of the second integrated operational amplifier is electrically connected to a second end of the seventh resistor;

an eighth resistor, wherein a first end of the eighth resistor is electrically connected to the positive input end of the second integrated operational amplifier;

a third integrated operational amplifier, wherein an output end of the third integrated operational amplifier is electrically connected to a second end of the eighth resistor; a negative input end of the third integrated operational amplifier is electrically connected to an output end of the third integrated operational amplifier;

a ninth resistor, wherein a first end of the ninth resistor is electrically connected to a negative input end of the second integrated operational amplifier; a second end of the ninth resistor is electrically connected to the ground terminal;

a tenth resistor, wherein a first end of the tenth resistor is electrically connected to an output end of the second integrated operational amplifier; a second end of the tenth resistor is electrically connected to the first end of the ninth resistor;

an eleventh resistor, wherein a first end of the eleventh resistor is electrically connected to the first end of the tenth resistor; a second end of the eleventh resistor is electrically connected to a positive input end of the third integrated operational amplifier; and a twelfth resistor, wherein a first end of the twelfth resistor is electrically connected to the second end of the eleventh resistor; and a second end of the twelfth resistor is electrically connected to the ground terminal.

* * * * *